Dec. 9, 1924.

L. F. LOYD

RESILIENT TIRE

Filed May 18, 1923

1,518,992

L. F. Loyd
INVENTOR

BY Victor J. Evans
ATTORNEY

Patented Dec. 9, 1924.

1,518,992

UNITED STATES PATENT OFFICE.

LOUIS F. LOYD, OF OELWEIN, IOWA.

RESILIENT TIRE.

Application filed May 18, 1923. Serial No. 639,891.

*To all whom it may concern:*

Be it known that I, LOUIS F. LOYD, a citizen of the United States, residing at Oelwein, in the county of Fayette and State of Iowa, have invented new and useful Improvements in Resilient Tires, of which the following is a specification.

This invention relates to resilient or spring tires for vehicle wheels, and an object of the invention is to provide a spring tire, which will embody the resilient cushioning properties of a pneumatic tire but which will eliminate many of the inconveniences of pneumatic tires, such as eliminating danger of punctures, blow outs or the like.

Another object of this invention is to provide a resilient tire structure which comprises a plurality of individual tread members yieldably carried by a rim structure, which tread members will increase the grip or traction on the surface over which the vehicle is traveling and will also eliminate the necessity of non-skid chains.

A further object of the invention is to provide a tire structure as specified in which the individual tread members are interchangeable and may be quickly and easily detached from the rim, for replacing in case they become worn and also to provide flat tread surfaces on the tread members which will materially decrease the liability of the tire miring in mud or soft road surfaces.

Other objects of the invention will appear in the following detailed description taken in connection with the accompanying drawing wherein:—

Figure 1:
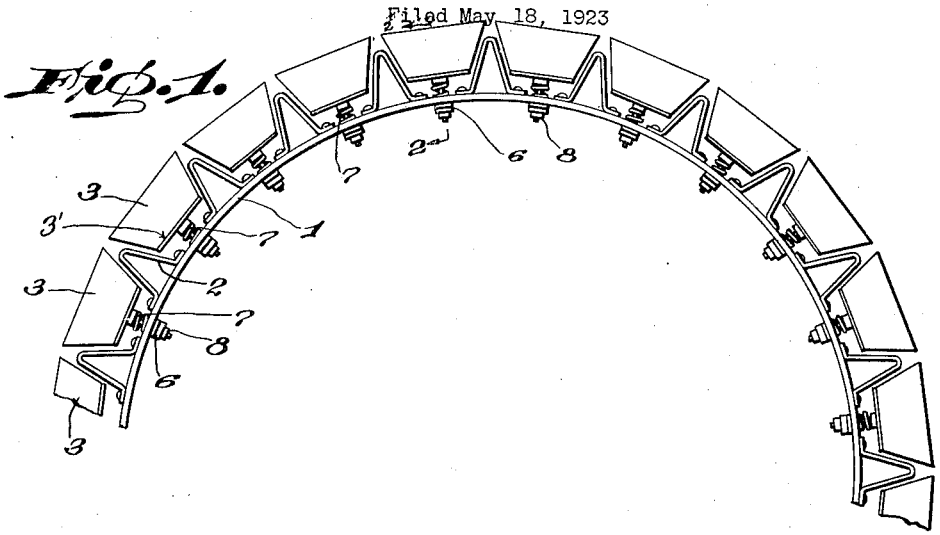
Fig. 1 is a fragmentary side elevation of the improved tire.
Figure 2:
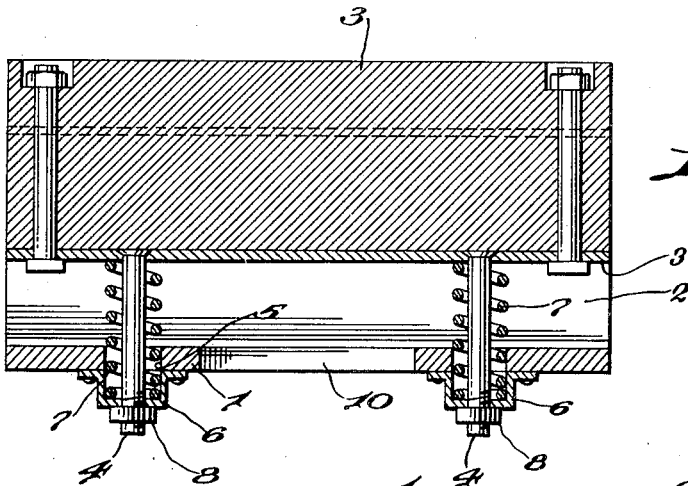
Fig. 2 is a cross section taken on the line 2—2 of Fig. 1.

Referring more particularly to the drawings, the improved resilient tire structure comprises a rim 1 which is constructed of any suitable material and has a plurality of inverted substantially V shaped members 2 attached thereto and projecting radially therefrom, at circumferentially spaced points. The members 2 project between the adjacent tread members 3 to prevent the accumulation of mud, etc., between the tread members. The tread members 3 comprise blocks of any suitable resilient material such as rubber or the like or if it is so desired they may be made of wood or non-resilient material without departing from the spirit of this invention. Plates 3' are attached to the tread members or blocks 3 in any suitable manner and they have bolts 4 riveted thereto which extend perpendicularly to the tread members and through suitable openings 5 in the rim 1. Spring cups 6 are carried by the inner surface of the rim 1 and receive the inner ends of the springs 7 which are coiled about the bolts 4 and press against the inner sides of the tread members 3 for yieldably holding the tread members projected outwardly from the rim 1. The bolts 4 are slidable relative to the rim and to the spring cups 6 and their slidable movement is limited by the nuts 8 which are threaded on the bolts. The tread members 3 are substantially frusto-pyramidal in shape with their bases positioned outwardly and the bases or outer surfaces of the tread members are preferably flat so as to increase the traction of the tire and particularly eliminate need for anti-skid devices in connection with the tire.

Figure 3:
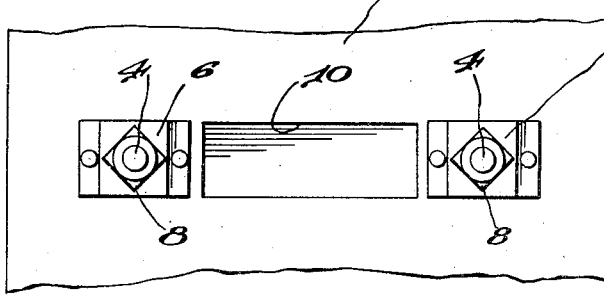
Fig. 3 is a fragmentary view of the inner side of the tire.

The rim 1 is provided with openings 10 at circumferentially spaced points to permit sand, mud or the like to work through the tire during its travel and prevent accumulation of the sand or mud between the tread members and the rim 1. By particular reference to Fig. 3 of the drawings it will be noted that the openings 10 are positioned between each pair of bolts 4 which connect the tread members to the rim.

It is, of course, to be understood that the invention may be constructed in other manners and the parts associated in different relations and, therefore, I do not desire to be limited in any manner except as set forth in the claims hereunto appended.

Having thus described my invention what I claim is:—

1. A resilient tire comprising a rim, a plurality of tread members, bolts connecting said tread members and rim, said bolts slidable relative to the rim to permit movement of the tread members radially of the rim, springs coiled about said bolts for yieldably supporting said tread members relative to the rim, and substantially inverted V shaped members carried by the rim and extending outwardly therefrom between the adjacent tread members, with their intermediate portions terminating inwardly a short distance from the outer faces of the tread members to prevent the accumulation of material between the treads.

2. A resilient tire comprising a rim, having openings therein upon opposite sides of its central portion, said openings being arranged in spaced circumferential alignment and spaced transverse alignment, spring cups secured to the inner surface of the rim in alignment with said openings, a plurality of tread members, bolts connecting said tread members and rim, said bolts slidable through the openings in the rim and through the cup members, springs coiled about said bolts having one end bearing against the inner surface of the treads and the other end arranged within said cups for yieldably supporting said tread members relative to the rim, said rim having additional openings extending transversely between the first openings, and inverted V shaped members carried by the rim and extending outwardly therefrom between the tread members.

3. A resilient tire comprising a rim, a plurality of tread members, bolts connecting said tread members and rim, said bolts slidable relative to the rim to permit movement of the tread members radially of the rim, springs coiled about said bolts for yieldably supporting said tread members relative to the rim, and substantially inverted V shaped members carried by the rim and extending outwardly therefrom between the adjacent tread members.

4. A resilient tire comprising a rim, a plurality of tread members, bolts connecting said tread members and rim, said bolts slidable relative to the rim to permit movement of the tread members radially of the rim, springs coiled about said bolts for yieldably supporting said tread members relative to the rim, and substantially inverted V shaped members carried by the rim and extending outwardly therefrom between the adjacent tread members, said rim provided with a plurality of openings, one positioned in close proximity to each of the tread members.

In testimony whereof I affix my signature.

LOUIS F. LOYD.